(12) United States Patent
Segarra, Jr. et al.

(10) Patent No.: US 10,970,016 B2
(45) Date of Patent: Apr. 6, 2021

(54) IMAGE PROCESSING SYSTEM, METHOD FOR IMAGE PROCESSING, AND IMAGE FORMING APPARATUS THAT ARE PROVIDED WITH SECURITY FUNCTION OF IMAGE

(71) Applicant: KYOCERA Document Solutions Inc., Osaka (JP)

(72) Inventors: Nixon Segarra, Jr., Osaka (JP); Deniel Molina, Osaka (JP); Jesus Jovannie John Burgos, Osaka (JP); Rodney Omangayon, Osaka (JP); Shiela Mae Quimbo, Osaka (JP); Vinald Rey Cagatan, Osaka (JP); Jefty Negapatan, Osaka (JP); John Mathew Cabido, Osaka (JP); Matthew Grafilo, Osaka (JP); Shaye Alysson Baisac, Osaka (JP); Melvin Gaviola, Jr., Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/862,016

(22) Filed: Apr. 29, 2020

(65) Prior Publication Data
US 2020/0356324 A1   Nov. 12, 2020

(30) Foreign Application Priority Data
May 10, 2019   (JP) .............................. JP2019-090163

(51) Int. Cl.
*G06F 3/12*   (2006.01)

(52) U.S. Cl.
CPC .......... *G06F 3/1238* (2013.01); *G06F 3/1222* (2013.01); *G06F 3/1253* (2013.01); *G06F 3/1292* (2013.01)

(58) Field of Classification Search
None
See application file for complete search history.

(56) References Cited

U.S. PATENT DOCUMENTS

| 2003/0012415 | A1 | 1/2003 | Cossel |
| 2016/0182762 | A1* | 6/2016 | Eum ..................... H04N 1/4413 358/1.14 |
| 2018/0341759 | A1* | 11/2018 | Sato ...................... G06F 3/1204 |

FOREIGN PATENT DOCUMENTS

| JP | 2003-123060 A | 4/2003 |
| JP | 2011-221847 A | 11/2011 |

* cited by examiner

*Primary Examiner* — Thomas D Lee
(74) *Attorney, Agent, or Firm* — IP Business Solutions, LLC (57) ABSTRACT

In an image processing system, a controller of an image forming apparatus, when user identification information is entered, causes a communication device to transmit a transmission request for an encryption code to a mobile terminal device at which the user identification information has been set, and, when the communication device receives the encryption code, uses the encryption code to encrypt image data. A controller of the mobile terminal device, when a communication device receives the transmission request for the encryption code, converts a fingerprint of a user detected by a fingerprint sensor into the encryption code, and causes the communication device to transmit the encryption code to the image forming apparatus.

9 Claims, 8 Drawing Sheets

IMAGE PROCESSING SYSTEM, METHOD FOR IMAGE PROCESSING, AND IMAGE FORMING APPARATUS THAT ARE PROVIDED WITH SECURITY FUNCTION OF IMAGE

INCORPORATION BY REFERENCE

This application claims priority to Japanese Patent Application No. 2019-090163 filed on May 10, 2019, the entire contents of which are incorporated by reference herein.

BACKGROUND

The present disclosure relates to an image processing system, a method for image processing, and an image forming apparatus, and particularly relates to a technique of improving security of an image.

As methods to improve security of images and the like, there is a method of using a password to protect the images. There is, however, concern for damages due to password cracking (calculation) or leakage.

There is an image forming apparatus provided with a code authentication unit that authenticates a user using code information, and a biometric authentication unit that further authenticates the user using biometric information representing physical characteristics of the user. In such the image forming apparatus, when the authentication is performed by the code authentication unit, an attribute related to document data is displayed but not details of the document data, and when the authentication is performed by the biometric authentication unit, instructions, with respect to the details of the document data, of displaying, printing, or transmitting to an external device are received.

In addition, as a device that biometrically authenticates an MFP user, there is a device that uses a scanner function to read a fingerprint of the user, compares the read fingerprint with the fingerprint of the user having usage right registered in advance, and, when the these fingerprints match, allows the user whose fingerprint has been read to access the MFP.

SUMMARY

A technique improved over the above techniques is proposed as one aspect of the present disclosure.

An image processing system according to one aspect of the present disclosure includes a terminal device and an image forming apparatus, the image forming performing data communication mutually with the terminal device. The image forming apparatus includes a storage device, an entry device, a first communication device, and a first controller. The storage device stores image data. Through the entry device, user identification information set in advance at the terminal device is entered. The first communication device performs the data communication with the terminal device. The first controller, when the user identification information is entered through the entry device, causes the first communication device to transmit a transmission request for an encryption code to the terminal device at which the user identification information has been set, and, when the first communication device receives the encryption code, encrypts in association with the encryption code the image data stored in the storage device. The terminal device includes a fingerprint sensor, a second communication device, and a second controller. The fingerprint sensor detects a fingerprint of a user. The second communication device performs the data communication with the image forming apparatus. The second controller, when the second communication device receives the transmission request for the encryption code, converts the fingerprint of the user detected by the fingerprint sensor into the encryption code, and causes the second communication device to transmit the encryption code to the image forming apparatus.

A method for image processing according to another aspect of the present disclosure is a method for image processing executed by a terminal device and by an image forming apparatus that performs data communication mutually with the terminal device. In the image forming apparatus, the method for image processing includes: a storage step of storing image data; an entry step of entering user identification information set in advance at the terminal device; a first control step of, when the user identification information is entered in the entry step, transmitting a transmission request for an encryption code to the terminal device at which the user identification information has been set; and a second control step of, when the encryption code is received from the terminal device, using the encryption code to encrypt the image data stored in the storage step. In the terminal device, the method for image processing includes: a detection step of detecting a fingerprint of a user; and a third control step of, when the transmission request for the encryption code is received, converting the fingerprint of the user detected in the detection step into the encryption code, and transmitting the encryption code to the image forming apparatus.

An image forming apparatus according to still another aspect of the present disclosure performs data communication mutually with a terminal device. The image forming apparatus includes a storage device, an entry device, a first communication device, and a first controller. The storage device stores image data. Through the entry device, user identification information set in advance at the terminal device is entered. The first communication device performs the data communication with the terminal device. The first controller, when the user identification information is entered through the entry device, causes the first communication device to transmit a transmission request for an encryption code to the terminal device at which the user identification information has been set, and, when the first communication device receives the encryption code, encrypts in association with the encryption code the image data stored in the storage device.

DETAILED DESCRIPTION

Hereinafter, a description will be given of an image processing system, an image forming apparatus, a mobile terminal device, and a method for processing image, all according to an embodiment of the one aspect of the present disclosure, with reference to the drawings.

Figure 1:
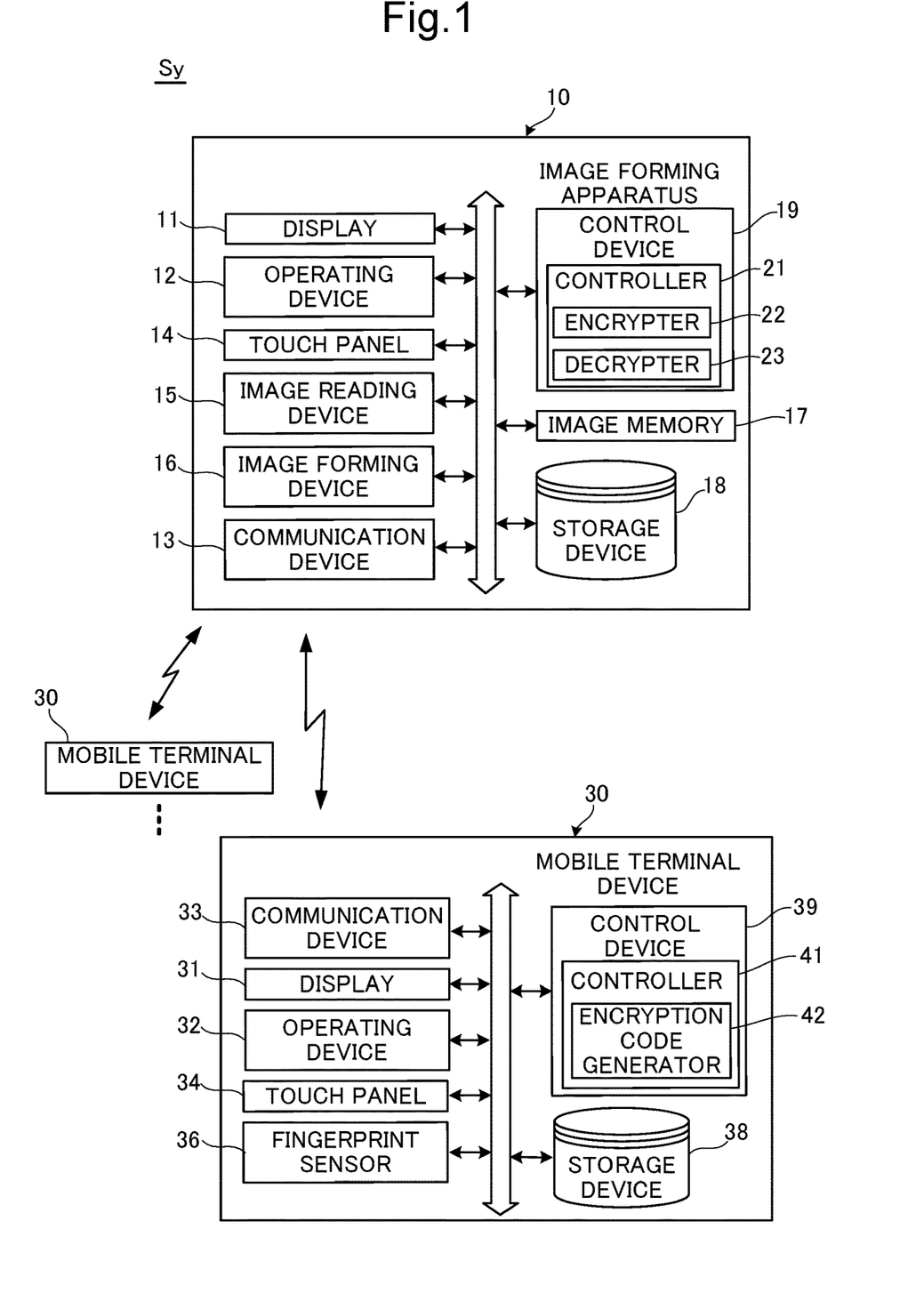
FIG. 1 is a block diagram showing an image processing system according to one embodiment of the present disclosure.

FIG. 1 is a block diagram showing an image processing system according to one embodiment of the present disclosure. The image processing system Sy of the present embedment connects an image forming apparatus 10 with a plurality of mobile terminal devices 30 via a network.

In this image processing system Sy, the image forming apparatus 10 is a multifunction peripheral (MFP) provided with multiple functions such as a copying function, a printing function, and a scanner function. The image forming apparatus 10 includes a display 11, an operating device 12, a communication device 13, a touch panel 14, an image reading device 15, an image forming device 16, a control device 19, and a storage device 18. The mentioned components are configured to transmit and receive data or signals to and from each other, via a bus.

The image reading device 15 includes a scanner that optically reads a document placed on a contact glass, and generates image data representing an image of the document.

The image forming device 16 includes: a photosensitive drum; a charging device that uniformly charges a surface of photosensitive drum; an exposing device that forms an electrostatic latent image on the surface of the photosensitive drum by exposure on the surface of the photosensitive drum; a developing device that develops the electrostatic latent image formed on the surface of the photosensitive drum into a toner image; and a transfer device that transfers the toner image (image) on the surface of the photosensitive drum onto a recording sheet, for example, and forms the image represented by the image data onto the recording sheet.

The display 11 is formed of, for example, a liquid crystal display (LCD) or an organic light-emitting diode (OLED) display.

The operating device 12 is provided with hard keys such as a numeric keypad, an enter key, and a start key.

The touch panel 14 is superposed on a screen of the display 11. The touch panel 14 detects touch on the touch panel 14 by, for example, a finger of a user, together with a position of the aforementioned touch. Through the touch panel 14, user's instructions performed on the screen of the display 11 are entered.

The communication device 13 is a communication interface having a communication module such as a LAN chip. The communication device 13 is connected to each mobile terminal device 30 via the network and performs data communication with each mobile terminal device 30.

An image memory 17 temporary stores the imaged data representing the image of the document read by the image reading device 15.

The storage device 18 is formed of, for example, a large-capacity solid state drive (SSD) or hard disk drive (HDD), and contains various types of data and programs.

The control device 19 is formed of a processor, a random access memory (RAM), a read only memory (ROM), and so on. The processor is, for example, a central processing unit (CPU), an application specific integrated circuit (ASIC), or a micro processing unit (MPU). The control device 19 is configured to act as a controller 21 when the processor executes a control program stored in the ROM or the storage device 18.

The control device 19 collectively controls the image forming apparatus 10. The control device 19 is connected to the display 11, the operating device 12, the communication device 13, the touch panel 14, the image reading device 15, the image forming device 16, the image memory 17, the storage device 18, and so on. The control device 19 controls each of the aforementioned components and performs transmission and reception of signals or data among these components.

The controller 21 is configured to serve a role as a processing device for executing various kinds of processing. In addition, the controller 21 is configured to control the display 11 and the communication device 13.

Furthermore, the controller 21 is configured to function as an encrypter 22 and a decrypter 23. The encrypter 22 uses a hash value to be described later, and encrypts the image data stored in the image memory 17. The decrypter 23 uses the hash value to decrypts the encrypted image data.

In this image processing system Sy, the plurality of mobile terminal devices 30 is smart phones, mobiles, or the like. Each of the mobile terminal devices 30 has a display 31, an operating device 32, a communication device 33, a touch panel 34, a fingerprint sensor 36, a storage device 38, and a control device 39. The mentioned components are configured to transmit and receive data or signals to and from each other, via a bus.

The display 31 is formed of, for example, an LCD or an OLED display.

The operating device 32 is a hard key operable by the user.

The touch panel 34 is superposed on a screen of the display 31. The touch panel 34 serves a role as the operating device.

The communication device 33 is a communication interface and connected to the image forming apparatus 10 via the network to transmit and receive data with the image forming apparatus 10.

The fingerprint sensor 36 is a well-known sensor that detects a fingerprint of a fingertip.

The storage device 38 is formed of, for example, a RAM or a ROM (flash memory), and contains various types of application programs, information, and so on.

The control device 39 is formed of a CPU (processor), a RAM, a ROM, and so on. The control device 39 is configured to act as a controller 41 when the CPU executes a control program stored in the ROM or the storage device 38.

The control device 39 collectively controls the mobile terminal device 30. The control device 39 is connected to the display 31, the operating device 32, the communication device 33, the touch panel 34, the fingerprint sensor 36, the storage device 38, and so on. The control device 39 controls each of the aforementioned components and performs transmission and reception of signals or data among these components.

The controller 41 is configured to serve a role as a processing device for executing various kinds of processing. In addition, the controller 41 is configured to control the display 31 and the communication device 33.

Furthermore, the controller 41 is configured to function as an encryption code generator 42 that performs processing of the encryption for the fingerprint detected by the fingerprint sensor 36. The encryption code generator 42, for example, extracts a feature point of the fingerprint detected by the fingerprint sensor 36, and uses a hash function to convert the feature point of the detected fingerprint into the hash value, to thereby perform the processing of the encryption.

Here, for example, when in the image forming apparatus 10 the user sets a document to the image reading device 15 and operates the start key provided on the operating device 12 to enter an instruction for executing a copy job, the controller 21 receives the instruction, causes the image reading device 15 to read an image of the document, causes the image memory 17 to temporality store image data representing the image of the document, and causes the image forming device 16 to input the image data and to print the image represented by the image data onto a recording sheet.

Also, in the image forming apparatus 10, in accordance with operation performed by the user on the operating device 12 or the touch panel 14, the controller 21 sets an encryption mode or a decryption mode. When the controller 21 sets the encryption mode, the controller 21 causes the image memory 17 to temporality store the image data representing the image read by the image reading device 15. Acting as the encrypter 22, the controller 21 uses the hash value to be described later as the encryption code to encrypt the image data within the image memory 17, and causes the storing device 18 to store the encrypted image data.

Furthermore, when the controller 21 sets the decryption mode, the controller 21 causes the storage device 18 read the encrypted image data into the image memory 17. Acting as the decrypter 23, the controller 21 uses the hash value to decrypt the encrypted image data within the image memory 17, and generates the original image data.

In addition, when the controller 21 sets the encryption mode or the decryption mode, the controller 21 of the image forming apparatus 10 causes the communication device 13 to transmit a transmission request for the hash value to the mobile terminal device 30 belongs to the user. At the mobile terminal device 30 of the user, when the communication device 33 receives the transmission request for the hash value, in response to the transmission request, the encryption code generator 42 extracts the feature point of the fingerprint of the user having been detected by the fingerprint sensor 36, and converts the feature point of the fingerprint into the hash value. The controller 41 causes the communication device 33 to transmit the hash value to the image forming apparatus 10.

The hash value is, therefore, generated at the mobile terminal device 30 side based on the fingerprint of the user in response to the transmission request for the hash value transmitted and received from the image forming apparatus 10 to the mobile terminal device 30, transmitted from the mobile terminal device 30 to the image forming apparatus 10, and used, at the image forming apparatus 10 side, to encrypt and decrypt the image data.

By this way of using the hash value based on the fingerprint to encrypt and decrypt the image data, the security of the image data can be enhanced.

The encryption code generator 42 of the controller 41 of the mobile terminal device 30 is configured to act through execution of the application program pre-stored in the ROM or the storage device 38. When receiving the user identification information ID unique to the application program, the encryption code generator 42 starts the processing of the encryption.

After being entered and authenticated at the image forming apparatus 10 side, the user identification information ID is transmitted from the image forming apparatus 10 to the mobile terminal device 30 of the user, and then authenticated again by the mobile terminal device 30. The encryption code generator 42 (application program) obtains the user identification information ID and starts the processing by the application program.

Therefore, unless the image forming apparatus 10 and the mobile terminal device 30 authenticate the user identification information ID, the encryption code generator 42 will not start the processing of generating the hash value to be used for the encryption and decryption. Thus, the hash value is not transmitted from the mobile terminal device 30 to the image forming apparatus 10 and the encryption and decryption of the image data are not performed.

The security of the image data can be enhanced also by using such the user identification information ID unique to the application program.

For example, at an initial setting of the encryption code generator 42 (application program) of the controller 41 of the mobile terminal device 30, the user identification information ID is generated by the application program and stored in the storage device 38 in association with the application program. At this point, the controller 41 transmits the user identification information ID to the image forming apparatus 10. Here, the user identification information ID may be any kind of information (such as alphanumeric symbols) entered by the user.

In the image forming apparatus 10, when the communication device 13 receives the user identification information ID from the mobile terminal device 30, the controller 21 causes the storage device 18 to store the user identification information ID. The user identification information ID is generated for each of the mobile terminal devices 30, and stored, as legitimate user identification information, in the storage device 18 as the data table DL shown in FIG. 2. That is, after being associated with the information indicating the mobile terminal device 30 at which the user identification information ID is set, the user identification information ID is stored in the storage device 18 as the data table DL.

Figure 2:
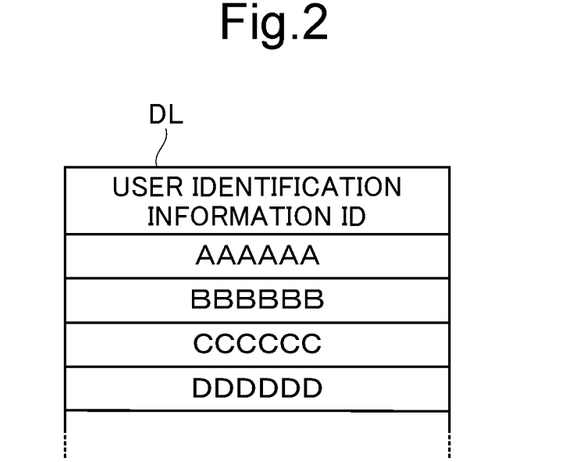
FIG. 2 is a diagram conceptually showing a data table on which user identification information ID of each mobile terminal device in the image processing system according to the present embodiment is stored.

This data table DL is referenced to authenticate the user identification information ID when setting the encryption mode or the decryption mode.

Next, processing procedures for setting the encryption mode and for encrypting the image data will be described with reference to the flowchart shown in FIG. 3.

In the image forming apparatus 10, firstly, suppose that the controller 21 is causing the display 11 to display an initial screen G1. On the initial screen G1, a plurality of function keys 51a, 51b, ... 51g, and 51h corresponding to the respective functions is displayed. While the initial screen G1 is displayed, when the user touches the function key 51g for setting the encryption mode, the controller 21 receives, through the touch panel 14, an instruction to set the encryption mode, which is associated with the function key 51g, and in accordance with the instruction, sets the image forming apparatus 10 at the encryption mode (S101).

Under the encryption mode is being set, when the user places a document on the image reading device 15 and operates the start key provided on the operating device 12, the controller 21 receives an document reading instruction, causes the image reading device 15 to read the image of the document in accordance with the instruction, causes the image memory 17 to temporarily store the image data representing the image (S102), and starts measuring an elapsed time T1 (S103).

Figure 5:
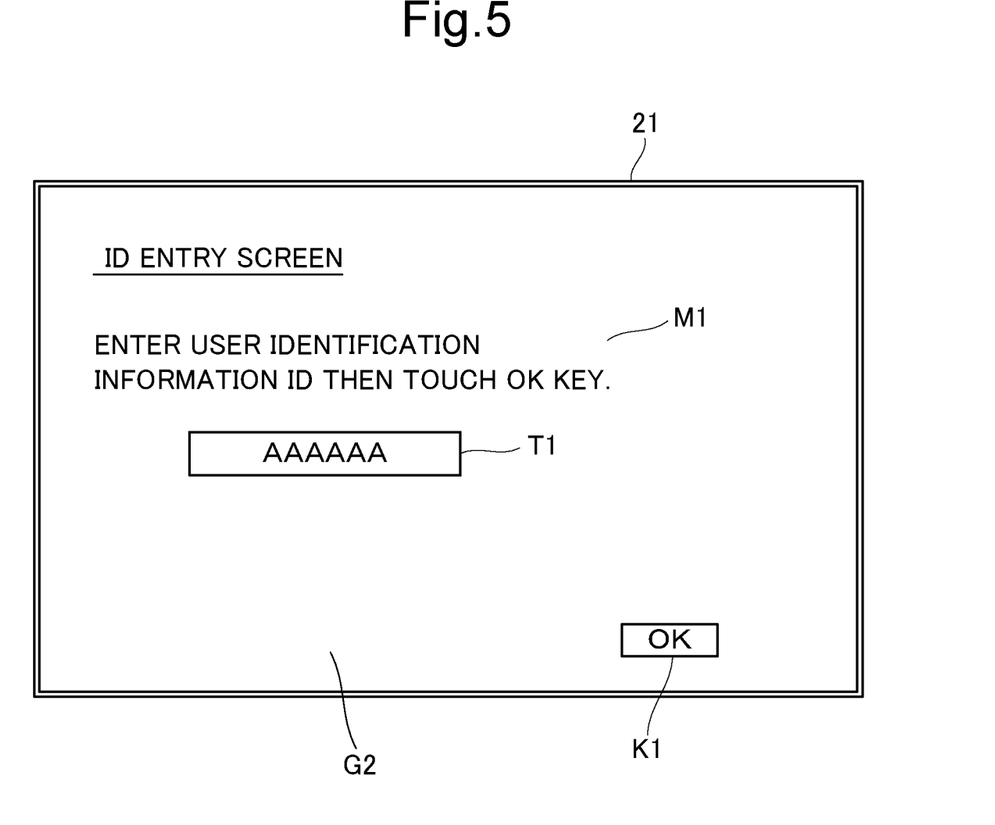
FIG. 5 is a diagram showing an ID entry screen displayed on the display of the image forming apparatus.

The controller 21 causes the display 11 to display an ID entry screen G2 shown in FIG. 5 for entering the user identification information ID (S104). The ID entry screen G2 shown in FIG. 5 displays a message M1 asking the user to enter the user identification information ID, a text box T1 into which the user identification information ID is to be entered, and an OK key K1.

Figure 6:
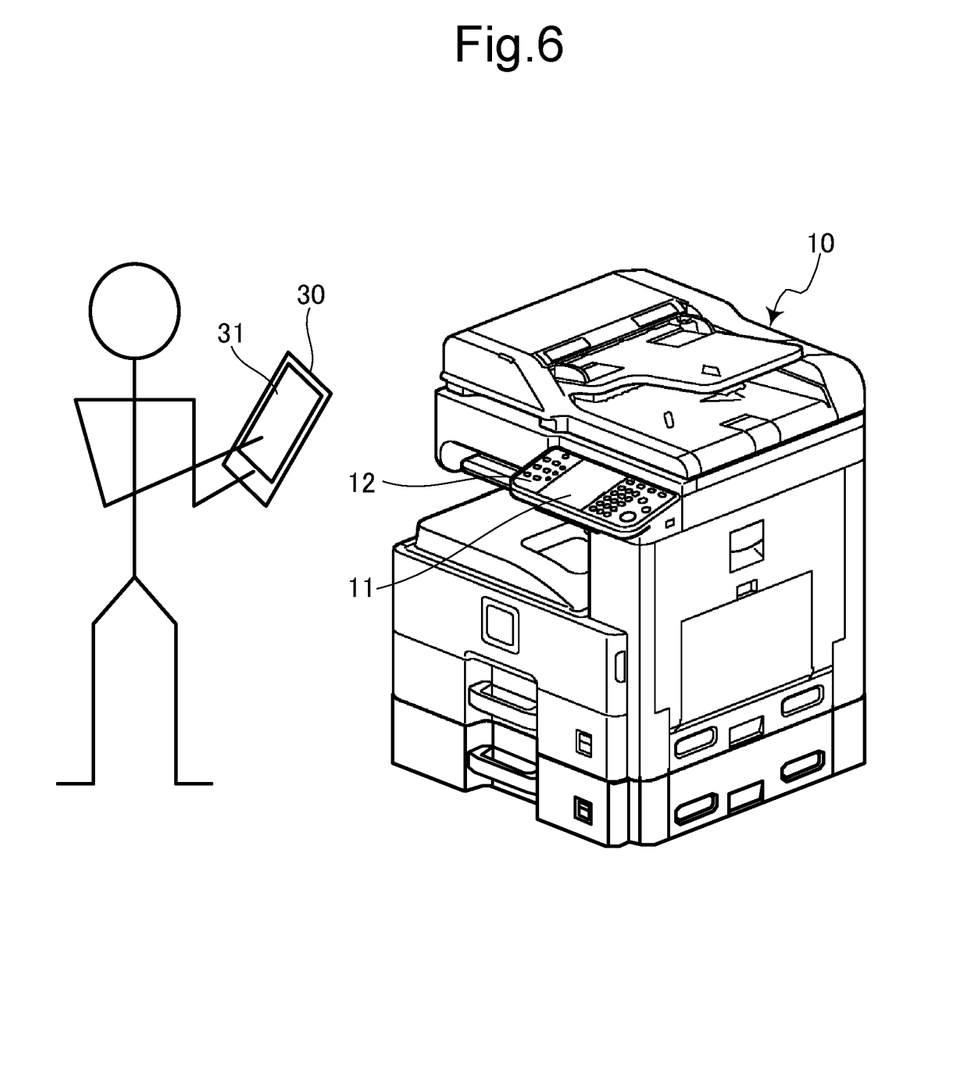
FIG. 6 is a diagram showing a state where a user is operating the image forming apparatus and the mobile terminal device.

As shown in FIG. 6, the user sees the message M1 displayed on the display 11 of the image forming apparatus 10, and operates the operating device 32 or the touch panel 34 of his or her mobile terminal device 30 to activate the encryption code generator 42 (application program) (S201). Upon the activation of the encryption code generator 42, the controller 41 of the mobile terminal device 30 reads out, from the storage device 38, the user identification information ID generated at the initial setting of the encryption code generator 42, and causes the display 31 to display the user identification information ID on the screen thereof (S202). At this time point, the controller 41 accesses the image forming apparatus 10 through the communication device 33 and starts data communication with the image forming apparatus 10 (S203).

The user sees the user identification information ID displayed on the display 31 of his or her mobile terminal device 30, touches the operating device 12 or the touch panel 14 of the image forming apparatus 10 to enter the user identification information ID to the text box T1 on the ID entry screen G2 displayed on the display 11 of the image forming apparatus 10, then touches the OK key K1.

In the image forming apparatus 10, while determining whether the elapsed time T1 reaches a predetermined certain time t (S105), the controller 21 is waiting for the instruction of approving the user identification information ID being displayed to be entered by the touch operation on the OK key K1 (S106). When the touch operation on the OK key K1 is not performed (NO at S106) and the elapsed time T1 reaches the certain time t (YES at S105), the controller 21 deletes the image data stored in the image memory 17 (S107) and ends the processing shown in FIG. 3.

When, before the elapsed time T1 reaches the certain time t (NO at S105), the controller 21 detects through the touch panel 14 that the instruction of approving the user identification information ID being displayed is entered by the touch operation on the OK key K1 (YES at S106), the controller 21 determines that the user identification information ID is entered, and determines whether the entered user identification information ID matches any user identification information ID on the data table DL shown in FIG. 2 (S108). For example, when determining that the entered user identification information ID does not match any of the user identification information ID on the data table DL (NO at S108), the controller 21 deletes the image data stored in the image memory 17 (S107). The processing ends thereafter.

When determining that the entered user identification information ID matches either user identification information ID on the data table DL (YES at S108), the controller 21 causes the communication device 13 to transmit the user identification information ID along with the transmission request for the hash value to the mobile terminal device 30 associated with the user identification information ID (S109). It may be defined in advance that based only on the transmission of the user identification information ID, the determination that the transmission request of the hash value to the mobile terminal device 30 is done is to be made.

Figure 3:
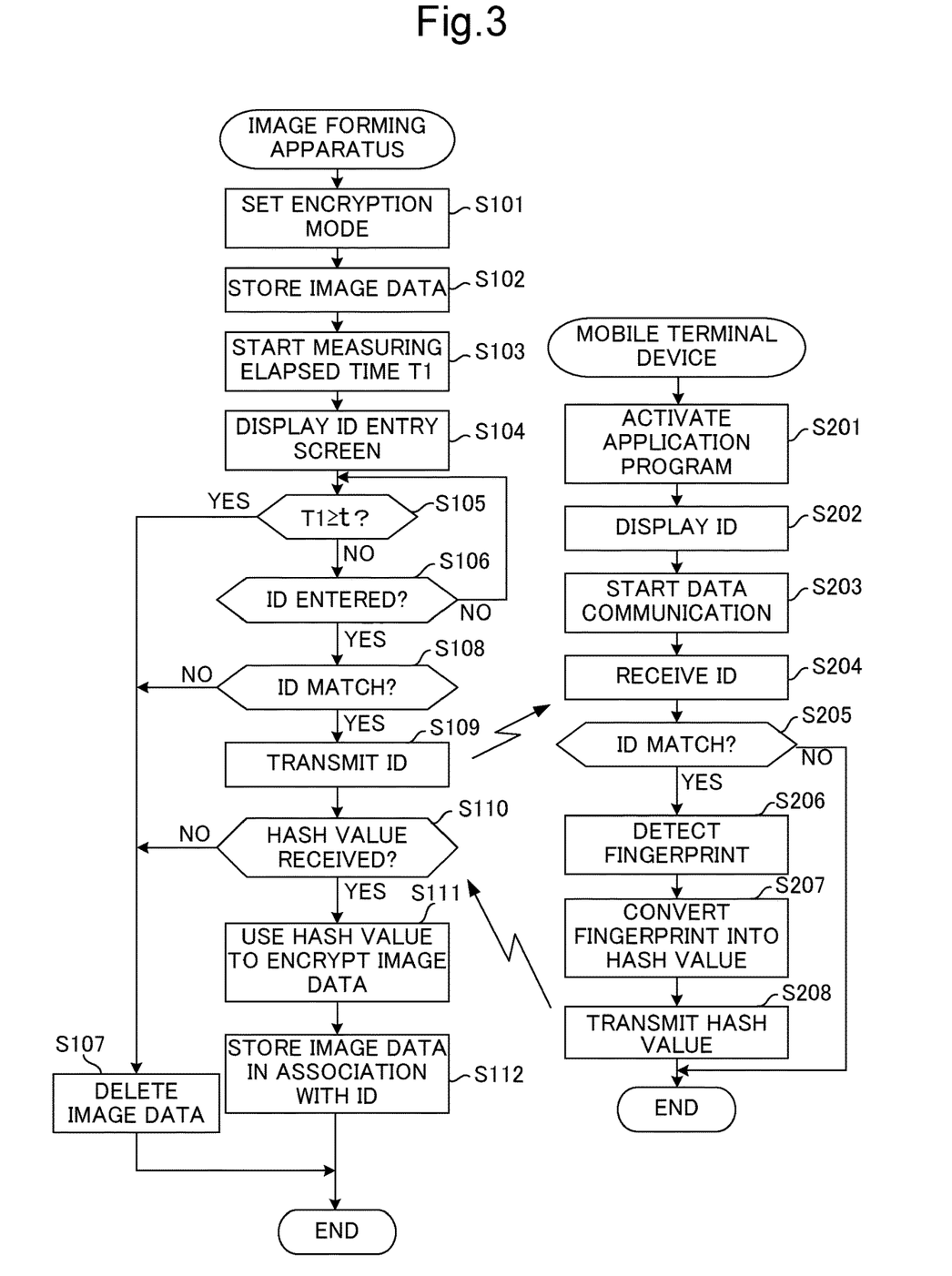
FIG. 3 is a flowchart showing processing procedures for setting an encryption mode and encrypting image data.
Figure 4:
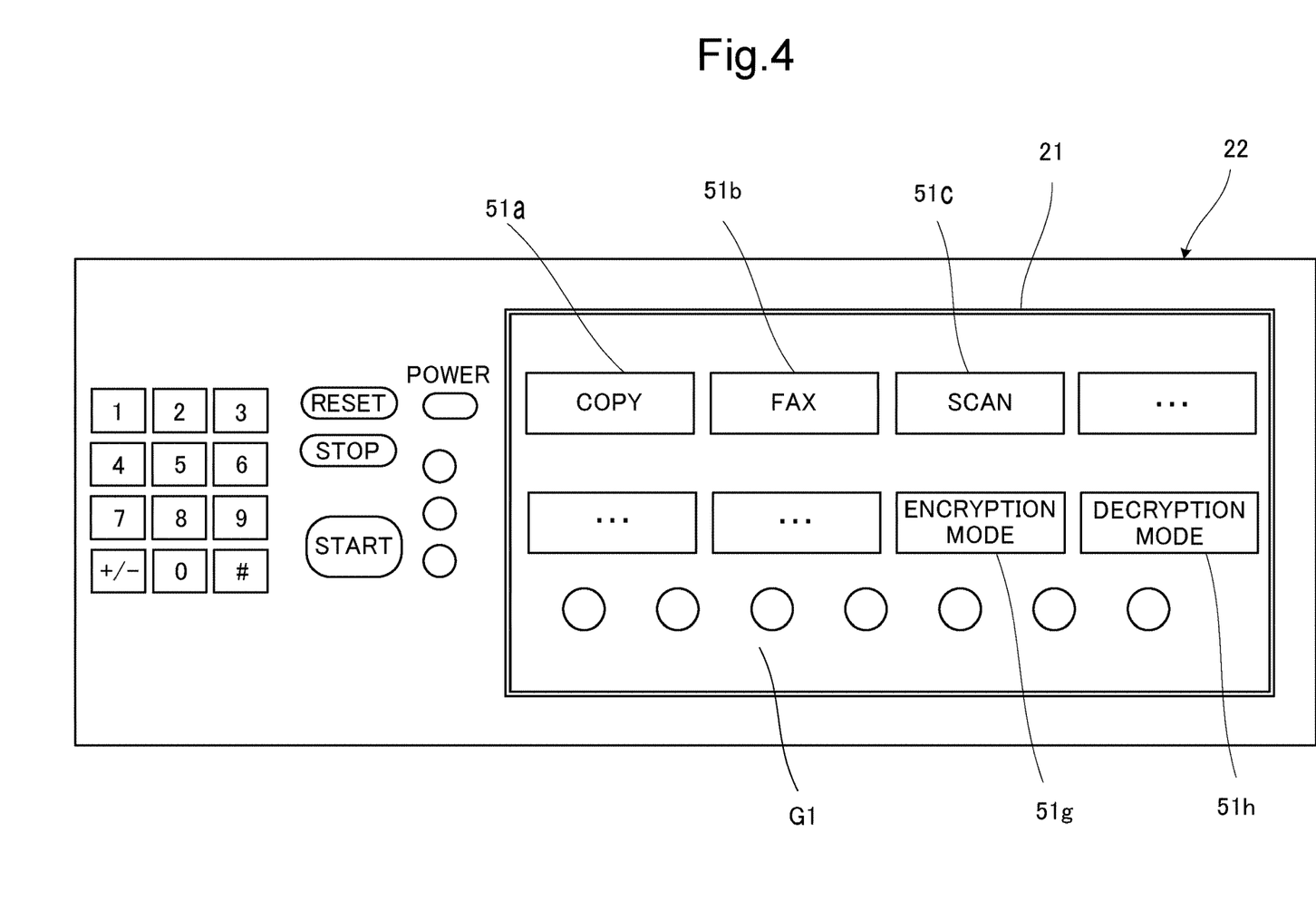
FIG. 4 is a diagram showing an initial screen displayed on a display of an image forming apparatus in the image processing system according to the present embodiment.

In the mobile terminal device 30, when the communication device 33 receives the user identification information ID and the transmission request for the hash value (S204), the controller 41 determines whether the received user identification information ID matches the user identification information ID stored in the storage device 38, that is, whether the received user identification information ID matches the user identification information ID generated at the initial setting of the encryption code generator 42 (S205), and, when the mismatch is determined (NO at S205), ends the processing shown in FIG. 3.

Figure 7:
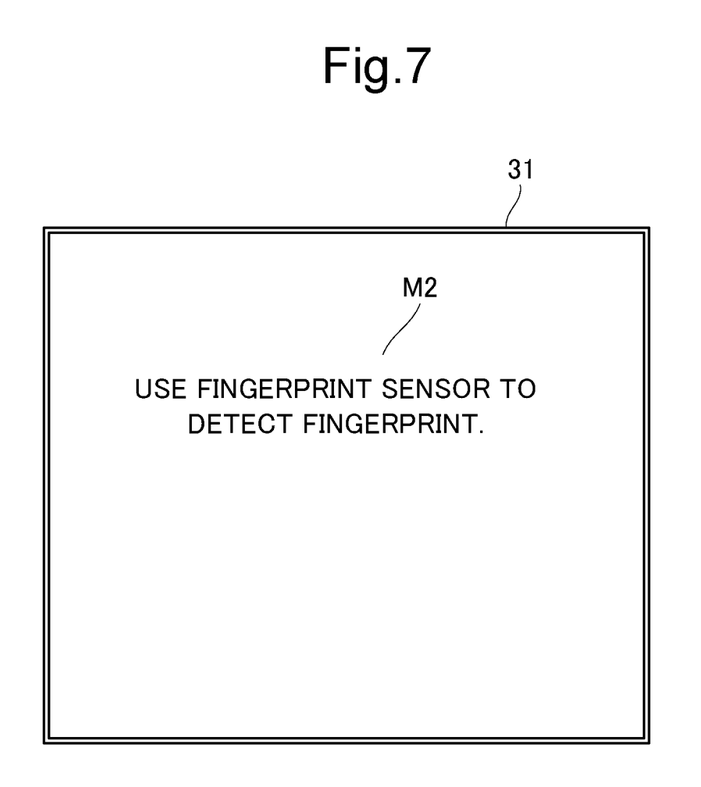
FIG. 7 is a diagram showing a message asking the user to perform fingerprint authentication displayed on a display of the mobile terminal device.

When determining that the received user identification information ID matches the user identification information ID stored in the storage device 38 (YES at S205), the controller 41 of the mobile terminal device 30 causes the display 31 to display, on the screen thereof, a message M2 asking the user to perform fingerprint authentication as shown in FIG. 7. The user sees the message M2 displayed on the display 31 of the mobile terminal device 30, and presses his or her finger to a detection surface of the fingerprint sensor 36. The fingerprint sensor 36 detects the fingerprint of the user (S206). The encryption code generator 42 of the controller 41 extracts the feature point of the fingerprint of the user detected by the fingerprint sensor 36 and uses the hash function to convert the feature point of the fingerprint into the hash value (S207). The controller 41 cause the communication device 33 to transmit the hash value to the image forming apparatus 10 (S208). Here, it is preferable to convert the feature point of the fingerprint into the hash value when, after the encryption code generator 42 repeatedly causes the fingerprint sensor 36 to detect the fingerprint for several times and the encryption code generator 42 extracts the feature point of the fingerprint every time the detection is performed, there are at least two sets of fingerprints that have a matching feature point. Thereby, the fingerprint detection accuracy can be increased and the error of the hash values can be prevented.

In the image forming apparatus 10, the controller 21 is waiting for the communication device 13 to receive the hash value (S110), and when the communication device 13 does not receive the hash value (NO at S110), the controller 21 deletes the image data stored in the image memory 17 (S107) and ends the processing shown in FIG. 3.

When the communication device 13 receives the hash value (YES at S110), the encrypter 22 of the controller 21 uses the received hash value as the encryption code to encrypt the image data stored within the image memory 17 (S111). The controller 21 causes the storage device 18 to store the encrypted image data in association with the user identification information ID entered in the text box T1 (S112).

In this manner the hash value generated at the mobile terminal device 30 side based on the fingerprint of the user is used to encrypt the image data at the image forming apparatus 10 side.

Next, processing procedures for setting the decryption mode and decrypting the image data will be described with reference to FIG. 8 and other drawings.

In the image forming apparatus 10, suppose that the controller 21 is causing the display 11 to display the initial screen G1 as shown in FIG. 4. Under this condition, when the user touches the function key 51h for setting the decryption mode, the controller 21 detects, through the touch panel 14, the touch operation performed on the function key 51h, receives the instruction for setting the decryption mode, and sets the decryption mode (S301).

Under the decryption mode is being set, the controller 21 starts measuring an elapsed time T2 (S302), and causes the display 11 to display the ID entry screen G2 shown in FIG. 5 for entering the user identification information ID (S303).

As shown in FIG. 6, the user sees the message M1 on the ID entry screen G2 displayed on the display 11 of the image forming apparatus 10, and operates the operating device 32 or the touch panel 34 of his or her mobile terminal device 30 to activate the encryption code generator 42 (application program) (S401). Upon the activation of the encryption code generator 42, the controller 41 of the mobile terminal device 30 reads out, from the storage device 38, the user identification information ID generated at the initial setting of the encryption code generator 42, and causes the display 31 to display the user identification information ID on the screen thereof (S402). At this time point, the controller 41 accesses the image forming apparatus 10 through the communication device 33 and starts data communication with the image forming apparatus 10 (S403).

The user sees the user identification information ID displayed on the display 31 of his or her mobile terminal device 30, touches the operating device 12 or the touch panel 14 of the image forming apparatus 10 to enter the user identification information ID to the text box T1 on the ID entry screen G2 displayed on the display 11 of the image forming apparatus 10, then touches the OK key K1.

In the image forming apparatus 10, while determining whether the elapsed time T2 reaches the certain time t (S304), the controller 21 is waiting for the instruction of approving the user identification information ID being displayed is entered by the touch operation on the OK key K1 (S305). When the touch operation on the OK key K1 is not performed (NO at S305) and the elapsed time T2 reaches the certain time t (YES at S304), the controller 21 ends the processing shown in FIG. 8.

When, before the elapsed time T2 reaches the certain time t (NO at S304), the controller 21 detects through the touch panel 14 that the instruction of approving the user identification information ID being displayed is entered by the touch operation on the OK key K1 (YES at S305), the controller 21 determines that the user identification information ID is entered, and determines whether the entered user identification information ID matches any user identification information ID on the data table DL shown in FIG. 2 (S306). For example, when determining that the entered user identification information ID does not match any of the user identification information ID on the data table DL (NO at S306), the controller 21 ends the processing shown in FIG. 8.

When determining that the entered user identification information ID matches either user identification information ID on the data table DL (YES at S306), the controller 21 reads out, from the storage device 18, the encrypted image data associated with the entered user identification information ID to be stored in the image memory 17 (S307), and also causes the communication device 13 to transmit the user identification information ID along with the transmission request for the hash value to the mobile terminal device 30 associated with the user identification information ID (S308). It may be defined in advance that based only on the transmission of the user identification information ID, the determination that the transmission request of the hash value to the mobile terminal device 30 is done is to be made.

Figure 8:
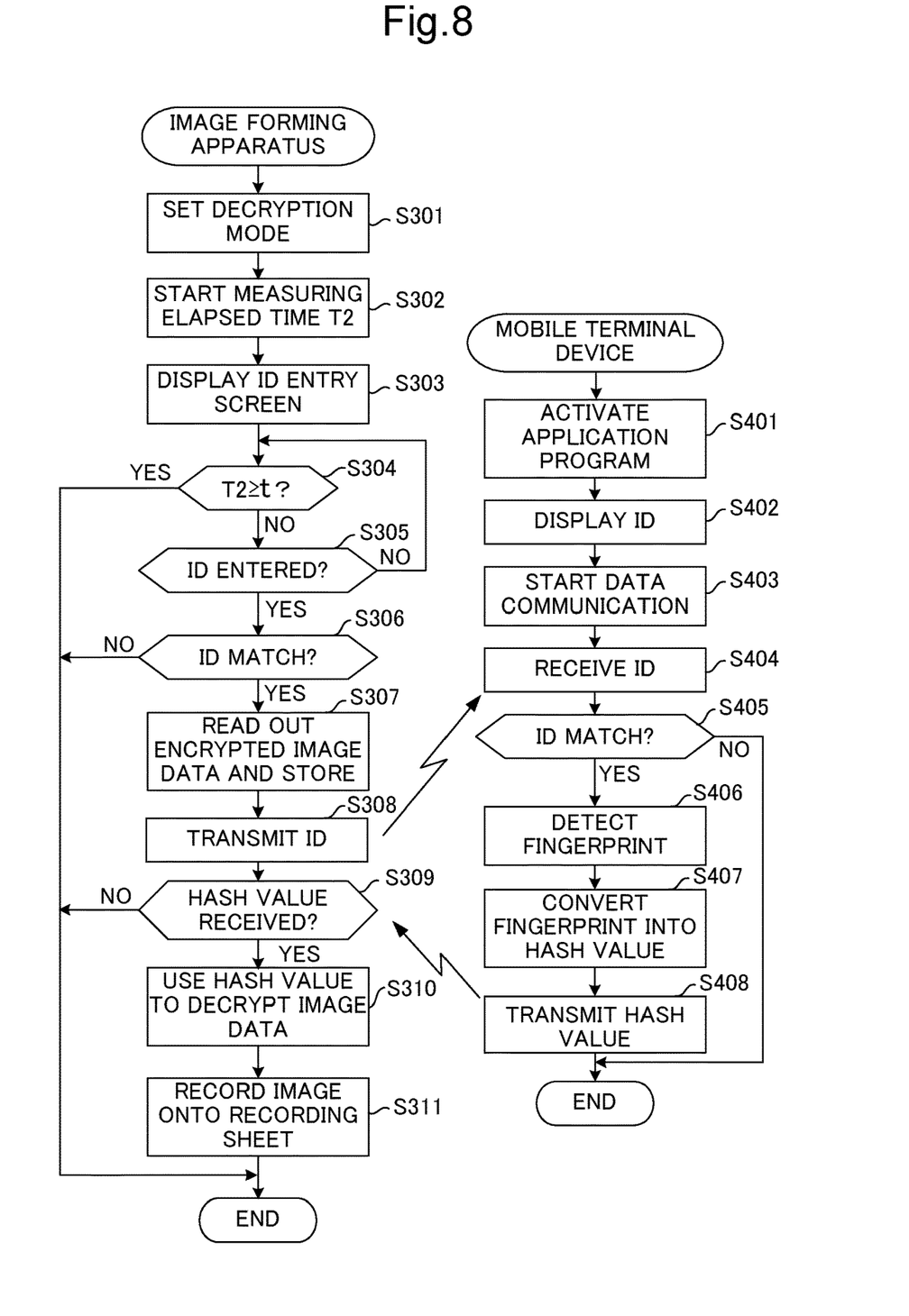
FIG. 8 is a flowchart showing processing procedures for setting a decryption mode and decrypting encrypted image data.

In the mobile terminal device 30, when the communication device 33 receives the user identification information ID (S404), the controller 41 determines whether the received user identification information ID matches the user identification information ID stored in the storage device 38 (S405), and, when the mismatch is determined (NO at S405), ends the processing shown in FIG. 8.

When determining that the received user identification information ID matches the user identification information ID stored in the storage device 38 (YES at S405), the controller 41 causes the display 31 to display, on the screen thereof, the message M2 asking the user to perform the fingerprint authentication as shown in FIG. 7. The user sees the message M2 displayed on the display 31 of the mobile terminal device 30, and presses his or her finger to the detection surface of the fingerprint sensor 36. The fingerprint sensor 36 detects the fingerprint of the user (S406). The encryption code generator 42 of the controller 41 extracts the feature point of the fingerprint detected by the fingerprint sensor 36 and uses the same hash function used at the step S207 to convert the feature point of the fingerprint into the hash value (S407). The controller 41 cause the communication device 33 to transmit the hash value to the image forming apparatus 10 (S408). Also in this processing, it is preferable to convert the feature point of the fingerprint into the hash value when, after the encryption code generator 42 repeatedly causes the fingerprint sensor 36 to detect the fingerprint for several times and the encryption code generator 42 extracts the feature point of the fingerprint every time the detection is performed, there are at least two sets of fingerprints that have a matching feature point.

In the image forming apparatus 10, the controller 21 is waiting for the communication device 13 to receive the hash value (S309), and when the communication device 13 does not receive the hash value (NO at S309), the controller 21 ends the processing shown in FIG. 8.

When the communication device 13 receives the hash value (YES at S309), the decrypter 23 of the controller 21 uses the received hash value as the decryption code to decrypt the encrypted image data stored in the image memory 17 and generates the original image data (S310). The controller 21 causes the image forming device 16 to record the image represented by the original image data onto the recording sheet (S311).

In this manner the hash value generated at the mobile terminal device 30 side based on the fingerprint of the user is used as the decryption code to decrypt the encrypted image on the image forming apparatus 10 side, and the image represented by the original image data is recorded onto the recording sheet.

The image data stored in the image memory 17 at step S307 is the image data that was stored in the storage device 18 in association with the user identification information ID and was encrypted using the hash value generated based on the fingerprint of the user detected by the fingerprint sensor 36 of the mobile terminal device 30. Also, the hash value to be used to decrypt the image data is based on the fingerprint of the user detected by the fingerprint sensor 36 of the mobile terminal device 30. Therefore, the hash value used to encrypt the image data and the hash value used to decrypt the image data are therefore the values being based on the same user's fingerprint so that they match each other. Thus, the encrypted image data can be decrypted.

As described thus far, the present embodiment is configured to use the hash value generated based on the fingerprint to encrypt and decrypt the image data, and to perform the encryption and the decryption based on the authentication of the user identification information ID. Therefore, it is capable of highly enhancing the security of the image data.

In addition, since the user authentication is performed using the existing fingerprint sensor 36 in the mobile terminal device 30, it is not necessary to provide the image forming apparatus 10 with a fingerprint sensor.

Here, the user may ask a third person that the user trusts to collect the recording sheet on which the image represented by the decrypted image data is recorded. For example, the user lets the third person know the user identification information ID and asks him or her to go to the image forming apparatus 10 and enter the user identification information ID to the image forming apparatus 10. When the user identification information ID and the transmission request for the hash value are transmitted from the image forming apparatus 10 to the mobile terminal device 30, the user causes the fingerprint sensor 36 of the mobile terminal device 30 detect his/her fingerprint and causes the mobile terminal device 30 transmit the hash value to the image forming apparatus 10. In the image forming apparatus 10, upon receiving the hash value, the encrypted image data is decrypted by use of the hash value and the image represented by the original image data having been decrypted is recorded onto the recording sheet. The third person that the user trusts collects the recording sheet. In this way, by only letting the third person know the user identification information ID, the image data can be decrypted and used without telling the information necessary for encrypting and decrypting the image data.

Furthermore, it may be configured such that the encrypted image data is stored on a storage on the Internet in association with the user identification information ID and the storage can be accessed by a plurality of the image forming apparatuses 10 through the Internet. In such case, in any of the image forming apparatuses 10, it is possible to read out the encrypted image data associated with the user identification information ID from the storage through the Internet and use the hash value received from the mobile terminal device 30 to decrypt the encrypted image data.

According to the above embodiment, the image data can be encrypted to improve security of the image data without complicating the apparatus. That is, in the above embodiment, without providing the sensor that detects biometric information or the fingerprint in the image forming apparatus 10, the user authentication is performed by using the biometric information or the fingerprint of the user, to improve the security.

The configurations and processing of the foregoing embodiments and variations detailed above with reference to FIG. 1 to FIG. 8 are merely exemplary, and not intended to limit the present disclosure to the configurations and processing.

While the present disclosure has been described in detail with reference to the embodiments thereof, it would be apparent to those skilled in the art the various changes and modifications may be made therein within the scope defined by the appended claims.

What is claimed is:

1. An image processing system comprising
a terminal device; and
an image forming apparatus that performs data communication mutually with the terminal device,
the image forming apparatus including:
a storage device that stores image data;
an entry device through which user identification information set in advance at the terminal device is entered;
a first communication device that performs the data communication with the terminal device; and
a first controller that, when the user identification information is entered through the entry device, causes the first communication device to transmit a transmission request for an encryption code to the terminal device at which the user identification information has been set, and, when the first communication device receives the encryption code, encrypts in association with the encryption code the image data stored in the storage device,
the terminal device including:
a fingerprint sensor that detects a fingerprint of a user;
a second communication device that performs the data communication with the image forming apparatus; and
a second controller that, when the second communication device receives the transmission request for the encryption code, converts the fingerprint of the user detected by the fingerprint sensor into the encryption code, and causes the second communication device to transmit the encryption code to the image forming apparatus.

2. The image processing system according to claim 1, wherein
the image forming apparatus further includes a data table on which legitimate user identification information is stored together with information indicating the terminal device at which the user identification information has been set, and
only when the user identification information entered through the entry device match the legitimate user identification information stored on the data table, the first controller causes the first communication device to transmit the transmission request for the encryption code to the terminal device at which the legitimate user identification information has been set.

3. The image processing system according to claim 1, wherein the second controller of the terminal device extracts a feature point of the fingerprint of the user detected by the fingerprint sensor, converts the feature point into a hash value by a hash function, and uses the hash value as the encryption code.

4. The image processing system according to claim 3, wherein
at processing of decryption of the image data, when the user identification information is entered through the entry device, the first controller of the image forming apparatus causes the first communication device to transmit a transmission request for the hash value to the terminal device at which the user identification information has been set, the hash value being used also as the encryption code, and when the first communication device receives the hash value, the first controller uses the hash value as a decryption code to decrypt the image data stored in the storage device and encrypted, and
when the second communication device receives the transmission request for the hash value, the second controller of the terminal device converts the fingerprint of the user detected by the fingerprint sensor into the hash value, and causes the second communication device to transmit the hash value to the image forming apparatus.

5. The image processing system according to claim 1, wherein at processing of encryption of the image data, when the first communication device is causes to transmit the transmission request for the encryption code to the terminal device but the encryption code is not received by the first communication device, the first controller of the image forming apparatus deletes the image data stored in the storage device and before being encrypted.

6. A method for image processing executed by a terminal device and by an image forming apparatus that performs data communication mutually with the terminal device, in the image forming apparatus, the method for image processing includes:

a storage step of storing image data;

an entry step of entering user identification information set in advance at the terminal device;

a first control step of, when the user identification information is entered in the entry step, transmitting a transmission request for an encryption code to the terminal device at which the user identification information has been set; and a second control step of, when the encryption code is received from the terminal device, using the encryption code to encrypt the image data stored in the storage step, in the terminal device, the method for image processing includes:

a detection step of detecting a fingerprint of a user; and a third control step of, when the transmission request for the encryption code is received, converting the fingerprint of the user detected in the detection step into the encryption code, and transmitting the encryption code to the image forming apparatus.

7. The method for image processing according to claim 6, wherein in the third control step executed in the terminal device, a feature point of the fingerprint of the user detected in the detection step is extracted, the feature point is converted into a hash value by a hash function, and the hash value is used as the encryption code.

8. The method for image processing according to claim 7, wherein in the image forming apparatus, at processing of decryption of the image data, when the user identification information is entered in the entry step, in the first control step, a transmission request for the hash value is transmitted to the terminal device at which the user identification information has been set, the hash value being used also as the encryption code, and as a fourth control step, when the hash value is received, the image data encrypted is decrypted by use of the hash value as a decryption code, in the terminal device, in the detection step, the fingerprint of the user is detected by a fingerprint sensor, and in the third control step, when the transmission request for the hash value is received, the fingerprint of the user detected in the detection step is converted into the hash value, and the hash value is transmitted to the image forming apparatus.

9. An image forming apparatus that performs data communication mutually with a terminal device, the image forming apparatus comprising:

a storage device that stores image data;

an entry device through which user identification information set in advance at the terminal device is entered;

a first communication device that performs the data communication with the terminal device; and a first controller that, when the user identification information is entered through the entry device, causes the first communication device to transmit a transmission request for an encryption code to the terminal device at which the user identification information has been set, and, when the first communication device receives the encryption code, encrypts in association with the encryption code the image data stored in the storage device.

* * * * *